US009401598B2

(12) United States Patent
Koch et al.

(10) Patent No.: US 9,401,598 B2
(45) Date of Patent: Jul. 26, 2016

(54) CONTROL UNIT FOR A MOTOR VEHICLE

(71) Applicant: Robert Bosch GmbH, Stuttgart (DE)

(72) Inventors: Stefan Koch, Kappelrodeck (DE); Jian Tian, Buehl (DE); Ralf-Peter Bergmann, Sasbach (DE); Stephan Mueller, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 219 days.

(21) Appl. No.: 14/349,196

(22) PCT Filed: Sep. 26, 2012

(86) PCT No.: PCT/EP2012/068953
§ 371 (c)(1),
(2) Date: Apr. 2, 2014

(87) PCT Pub. No.: WO2013/050281
PCT Pub. Date: Apr. 11, 2013

(65) Prior Publication Data
US 2015/0043111 A1 Feb. 12, 2015

(30) Foreign Application Priority Data
Oct. 5, 2011 (DE) .......................... 10 2011 084 006

(51) Int. Cl.
*H02H 7/08* (2006.01)
*B60L 3/00* (2006.01)
(Continued)

(52) U.S. Cl.
CPC ............ *H02H 7/0833* (2013.01); *B60L 3/0007* (2013.01); *B60L 3/0046* (2013.01);
(Continued)

(58) Field of Classification Search
CPC ........................... H02H 7/0833; H01H 1/0007

USPC ............................................................ 361/54
See application file for complete search history.

(56) References Cited

U.S. PATENT DOCUMENTS

| 6,211,681 | B1 | 4/2001 | Kagawa et al. |
| 2003/0038612 | A1 | 2/2003 | Kutkut |

(Continued)

FOREIGN PATENT DOCUMENTS

| AT | 505507 | 1/2009 |
| DE | 102007022515 | 11/2008 |

(Continued)

OTHER PUBLICATIONS

International Search Report for Application No. PCT/EP2012/0689553 dated Jul. 3, 2013 (English Translation, 3 pages).

(Continued)

*Primary Examiner* — Scott Bauer
(74) *Attorney, Agent, or Firm* — Michael Best & Friedrich LLP

(57) ABSTRACT

The invention relates to a control unit for a motor vehicle. Said control unit comprises a voltage converter which has an inlet for a direct voltage network. Said voltage converter is designed to generate a direct voltage smaller than an input voltage on the inlet for the direct voltage network and the direct voltage is emitted on the outlet side. According to the invention, the voltage converter comprises an inverter and a transformer which is connected to said inverter. Said voltage converter also comprises an inlet for a discharge signal and is designed to discharge by means of the inverter an intermediate circuit capacitor which is connected to the inlet of the direct voltage network in accordance with the discharge signal, and to reduce a working frequency of the inverter, in particular, compared to the frequency with no discharge signal.

13 Claims, 3 Drawing Sheets

(51) Int. Cl.
  *B60L 3/04* (2006.01)
  *B60L 11/00* (2006.01)
  *B60L 11/12* (2006.01)
  *H02H 3/14* (2006.01)
  *H02H 1/00* (2006.01)
  *H02H 5/04* (2006.01)
  *H02H 5/10* (2006.01)

(52) U.S. Cl.
  CPC ........... *B60L 3/0069* (2013.01); *B60L 3/04* (2013.01); *B60L 11/005* (2013.01); *B60L 11/126* (2013.01); *H02H 1/0007* (2013.01); *H02H 3/14* (2013.01); *H02H 5/04* (2013.01); *H02H 5/10* (2013.01); *B60L 2210/12* (2013.01); *B60L 2240/526* (2013.01); *B60L 2240/529* (2013.01); *Y02T 10/6217* (2013.01); *Y02T 10/7011* (2013.01); *Y02T 10/7022* (2013.01); *Y02T 10/7077* (2013.01); *Y02T 10/7233* (2013.01)

(56) References Cited

U.S. PATENT DOCUMENTS

| | | | |
|---|---|---|---|
| 2004/0070995 | A1 | 4/2004 | Sugimoto |
| 2006/0222910 | A1* | 10/2006 | Aoyagi ............ B60H 1/00392 429/432 |
| 2010/0102638 | A1* | 4/2010 | Chen ................. B60L 3/04 307/100 |
| 2010/0109437 | A1* | 5/2010 | Fattic ................ B60K 6/48 307/47 |
| 2010/0213904 | A1 | 8/2010 | Yamada |
| 2011/0049977 | A1 | 3/2011 | Onnerrud et al. |
| 2011/0133546 | A1* | 6/2011 | Jang ............... H02M 7/53871 307/9.1 |
| 2012/0055727 | A1* | 3/2012 | Omiya ............. B60K 6/445 180/279 |
| 2012/0268078 | A1* | 10/2012 | Kajouke ............ H02M 5/293 320/166 |

FOREIGN PATENT DOCUMENTS

| | | |
|---|---|---|
| DE | 102008061585 | 6/2010 |
| JP | 2005229689 | 8/2005 |
| WO | 9534937 | 12/1995 |
| WO | 2008031669 | 3/2008 |

OTHER PUBLICATIONS

Chen et al., "Integrated Current Sensing Circuit Suitable for Step-Down DC-DC Converters," 35th Annul IEEE Power Electronics Specialists Conference, 2004, pp. 1140-1142.

Sari et al., "Design and implementation of a microprocessor based high frequency switching mode power supply," Fifth European Conference on Power Electronics and Applications, 1993, pp. 334-337.

* cited by examiner

CONTROL UNIT FOR A MOTOR VEHICLE

BACKGROUND OF THE INVENTION

The invention relates to a control unit for a motor vehicle. The control unit comprises a voltage converter, wherein the voltage converter comprises an input for a direct voltage supply system. The voltage converter is designed so as to generate a direct voltage that is less than an input voltage at the input for the direct voltage supply system and to output the direct voltage on the output side.

In the case of on-board supply systems that are known in the prior art for electric vehicles, capacitors in an intermediate circuit are operated with a voltage of more than 200 volt in order to supply an electric drive of the motor vehicle. This voltage represents a danger in the event of contact with a human. In the event of an accident, the intermediate circuit is discharged by way of an ohmic resistance so that a helper—by way of example when extinguishing a fire on-board the motor vehicle—cannot receive an electric shock.

SUMMARY OF THE INVENTION

In accordance with the invention, the voltage converter of the type mentioned in the introduction comprises an inverter and a transformer that is connected to the inverter. The voltage converter also comprises an input for a discharge signal and is designed so as in response to the discharge signal to discharge by way of the inverter an intermediate circuit capacitor that is connected to the input for the direct voltage supply system and for this purpose to reduce a working frequency of the inverter—in particular in comparison to when a discharge signal is not provided.

As a consequence, the alternating current resistance of the transformer that is connected to the inverter is advantageously reduced. The intermediate circuit capacitor that is connected to the voltage converter can thus be discharged in an advantageous manner rapidly at least in part or fully—preferably at least until a pre-defined voltage value has been achieved. In a further advantageous manner, it is thus not necessary in order to discharge the intermediate circuit capacitor to provide additional components, such as for example ohmic resistors or switching elements that are designed so as to switch in the ohmic resistors parallel to the intermediate circuit capacitor.

In a further advantageous manner and in response to the discharge signal, a battery, in particular a high voltage battery, that is connected to the intermediate circuit and is designed so as to store electrical energy having a voltage of at least 200 volt, preferably between 200 and 500 volt, can be disconnected by means of a disconnecting switch from the intermediate circuit and thus from the intermediate circuit capacitor. Thus, the electrical energy that is stored in the intermediate circuit capacitor—and in the capacitive components that are in addition connected to the intermediate circuit—remains in the intermediate circuit. This electrical energy that is remaining in the intermediate circuit after disconnecting the high voltage battery from the intermediate circuit can then in an advantageous manner connect the intermediate circuit potential to a ground connection—preferably without additional ohmic resistors. Thus, the intermediate circuit can be discharged by way of the voltage converter, which is already provided in an on-board supply system of an electric vehicle, at least until a voltage—by way of example less than 60 volt—that does not pose a danger in the event of contact with a human has been achieved. The voltage converter is by way of example connected on the output side to a low voltage supply system, in particular to a 12 volt or a 24 volt low voltage supply system.

The term 'high voltage' is understood to mean a voltage that poses a danger in the event of contact with a human, in particular a voltage of more than 60 volt.

The term 'low voltage' is understood to mean a voltage that does not pose a danger in the event of contact with a human, in particular a voltage of less than 60 volt.

In a preferred embodiment, the control unit, in particular the voltage converter, is designed so as in response to the discharge signal at least to halve the working frequency of the inverter. The intermediate circuit capacitor can thus be discharged advantageously at least twice as rapidly than when a discharge signal is not provided, which results in a reduction of the working frequency of the voltage converter in comparison to a working frequency when a discharge signal is not provided.

In a preferred embodiment, the voltage converter is designed so as in response to a magnetic flux, preferably in response to a saturation of the magnetic flux in the transformer, to limit a current that is switched from the inverter to the transformer—preferably by means of a limited reduction in the working frequency or by means of a pulse width modulation control of the inverter. In this manner, the transformer and/or the inverter are advantageously prevented from overheating.

In an advantageous embodiment, the control unit comprises at least one temperature sensor that is arranged and designed so as to detect a temperature of the transformer and/or of the inverter and to generate a corresponding temperature signal. The control unit is designed in this embodiment so as in addition to limit the current in response to the temperature signal.

In an advantageous manner and in response to the discharge signal, it is not necessary when using the control unit that is designed in this manner to transfer the electrical energy that is remaining in the intermediate circuit after disconnecting the battery from the intermediate circuit into a low voltage supply system that is connected on the output side to the voltage converter. Whether or not the electrical energy that is stored in the intermediate circuit is transferred to the low voltage supply system by means of the voltage converter then depends upon the state of the consumer that is connected into the low voltage supply system and is connected on the output side to the voltage converter. If, by way of example, a battery that is connected to the low voltage supply system is not fully charged, then it is possible, in addition to reducing the electrical energy in the intermediate circuit in a controlled manner, as previously described, by means of limiting the magnetic flux to transfer at least part of the electrical energy of the intermediate circuit by way of the voltage converter into the low voltage supply system and to transfer said part of the electrical energy into the low voltage battery that has not yet been fully discharged.

It is preferred that the voltage converter comprises a current sensor, wherein the current sensor is designed so as to detect the current and to generate a current signal that represents the current. The voltage converter is preferably further designed so as to adjust the working frequency in dependence upon the current signal. The current signal can be formed by way of example by means of a voltage that reduces across a current sensor that is embodied as a shunt resistor. In a different embodiment, the current sensor is formed by means of an impedance-matching transformer, wherein a primary coil of the impedance-matching transformer is connected in series to a primary coil of the transformer.

In a preferred embodiment, the control unit comprises a controllable disconnecting switch. The disconnecting switch preferably comprises a connection for an electric battery and a connection for the intermediate circuit capacitor. The control unit is preferably designed so as in response to the discharge signal to generate a disconnection signal and to transmit said disconnection signal to the disconnecting switch in order to disconnect the battery from the at least one intermediate circuit capacitor. The disconnecting switch is preferably designed so as in response to the disconnection signal to disconnect the connection for the battery from the connection for the intermediate circuit capacitor. The disconnecting switch is embodied by way of example as a relay or as a semi-conductor switch.

The invention relates also to a switching arrangement for a vehicle having an electric drive. The vehicle is by way of example an electric vehicle or a hybrid vehicle. A hybrid vehicle preferably comprises in addition to the electric drive a drive that comprises a combustion engine.

It is preferred that the switching arrangement comprises a control unit in accordance with the above-described type. It is preferred that the switching arrangement comprises the at least one intermediate circuit capacitor, wherein the intermediate circuit capacitor is connected to the input for the direct voltage supply network. The input for the direct voltage supply network is preferably connected by way of the disconnecting switch to the connection for the battery.

It is preferred that the battery is a component of the switching arrangement and is connected to the connection for the battery. It is thus possible in an advantageous manner to disconnect the battery from the input for the direct voltage supply network in response to the disconnection signal. The electrical energy that remains in the intermediate circuit is thus limited to the energy that is stored in the intermediate circuit capacitor and further capacitive elements of the intermediate circuit. This energy that is remaining in the intermediate circuit can in response to the discharge signal be advantageously at least in part discharged by way of the control unit, in particular by way of the voltage converter until the voltage remaining in the intermediate circuit capacitor does not pose a danger for a human.

It is preferred that the switching arrangement comprises an engine hood switch. The engine hood switch is preferably connected to the input for the discharge signal. The engine hood switch is preferably designed so as to generate the discharge signal in response to an engine hood of the vehicle being opened. It is thus possible in an advantageous manner, in the case of an engine hood being opened by a user or in order to perform maintenance work or repair work on the vehicle, to reduce the electrical energy stored in the intermediate circuit in an advantageously rapid manner by way of the inverter. The user of the vehicle—or a member of the service personnel—can thus in an advantageous manner not receive an electric shock from the intermediate circuit voltage when examining or repairing the vehicle.

It is by way of example of further advantage that the discharge signal is generated by means of the engine hood switch in the case of a fire in the engine compartment of the vehicle. If the engine hood is namely opened by a rescuer or a member of the fire brigade in order to extinguish a fire in the engine compartment of the vehicle, the member of the fire brigade could thus receive an electric shock by way of the firefighting water that comes into contact with the intermediate circuit or electrical components of the intermediate circuit.

Independent of or in addition to the engine hood switch, the switching arrangement can comprise a fire sensor. The fire sensor is designed so as to detect smoke gas and in dependence upon the detected smoke gas to generate the discharge signal and to output said signal on the output side. The smoke gas sensor is connected on the output side to the input for the discharge signal.

In a preferred embodiment, the switching arrangement comprises a main switch for the vehicle, in particular an electric vehicle, which main switch is connected to the input for the discharge signal and is preferably designed in such a manner that it can be operated by means of key. The main switch is operatively connected to the input for the discharge signal in such a manner that the discharge signal is generated in the case of the main switch being switched off. As a consequence, it is advantageous that the intermediate circuit is discharged in the case of the electric vehicle being switched off so that the electric vehicle can be switched off or parked in an advantageous manner with an intermediate circuit that is discharged—preferably at least until a voltage that does not pose a danger is achieved.

In a preferred embodiment of the switching arrangement, the switching arrangement comprises an accident sensor that is connected to the input for the discharge signal. The accident sensor is designed so as to detect the discharge signal in response to an acceleration acting on the accident sensor and to generate the discharge signal in dependence upon the acceleration. The accident sensor can be formed by way of example by means of an acceleration sensor of an airbag.

The invention also relates to a motor vehicle having an electric drive having a control unit of the type described above or to a switching arrangement of the type described above.

The invention also relates to a method for discharging an intermediate circuit capacitor of a switching arrangement for an electric vehicle or a hybrid vehicle. In the case of the method for discharging an intermediate circuit capacitor of a switching arrangement comprising a voltage inverter that is connected to the intermediate circuit capacitor, a discharge signal is generated and a battery that is connected to the intermediate circuit is disconnected from the intermediate capacitor in response to the discharge signal. It is preferred in the case of the method that a working frequency of an inverter of the voltage converter is reduced in comparison to when a discharge signal is not provided so that the intermediate circuit capacitor is discharged by way of the inverter—more rapidly than if a discharge signal is not provided.

It is preferred in the case of the method that a current is limited by means of the inverter in response to a magnetic flux in a transformer that is connected to an output of the inverter.

It is preferred in the case of the method that the discharge signal is generated in response to an engine hood of an electric vehicle being opened, in response to an acceleration signal that represents an accident of the electric vehicle or in response to an alarm signal that represents a fire on board the electric vehicle, or in response to a switch-off signal that represents a switch-off of the electric vehicle and originates from a main switch of an electric vehicle, which main switch is preferably designed in such a manner that it can be operated by means of key.

BRIEF DESCRIPTION OF THE DRAWINGS

The invention is now described hereinunder with reference to figures and further exemplary embodiments.

DETAILED DESCRIPTION

Figure 1:
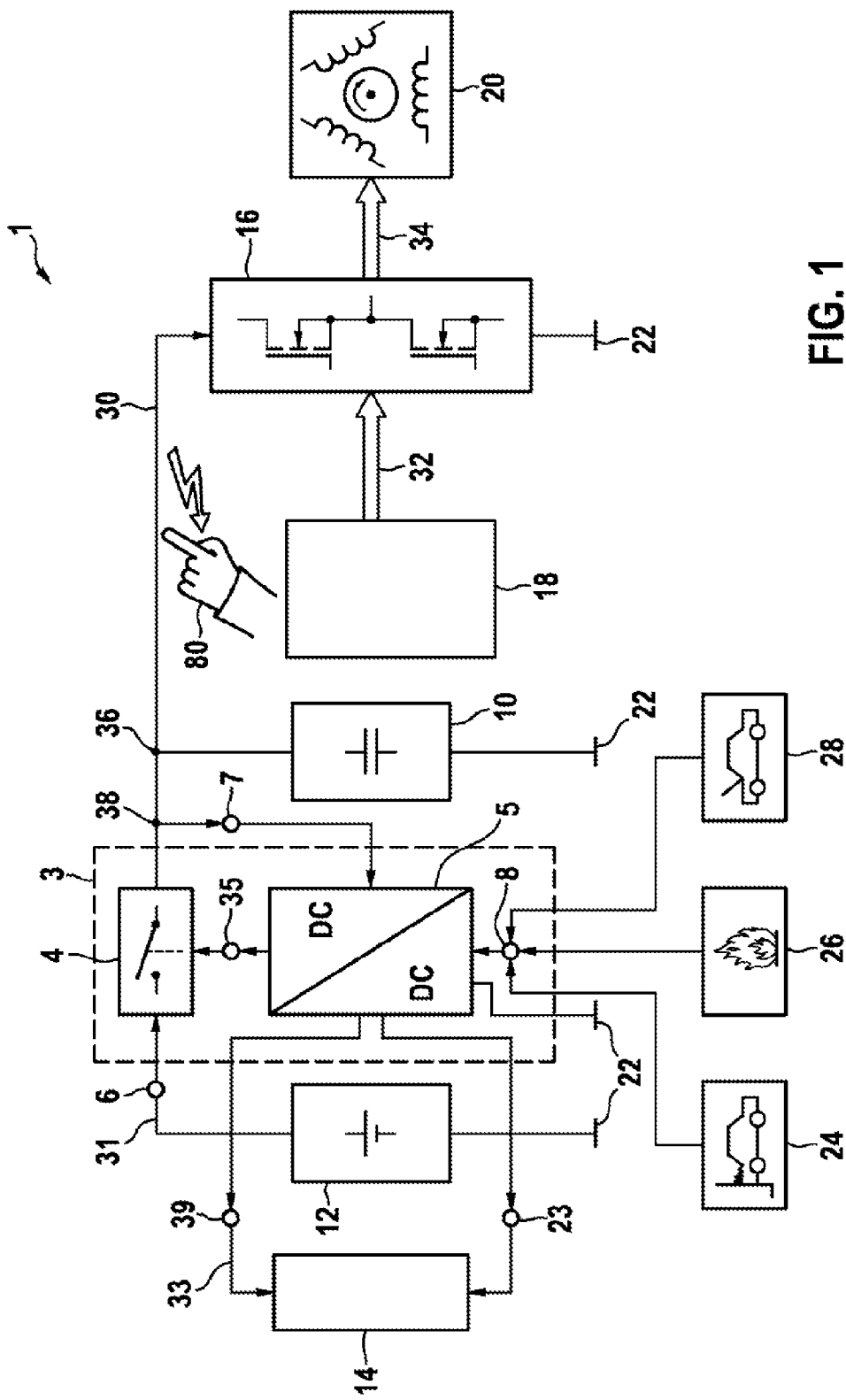
FIG. 1 illustrates schematically an exemplary embodiment for a switching arrangement of a part of an on-board supply system for an electric vehicle.

FIG. 1 illustrates an exemplary embodiment for a switching arrangement 1. The switching arrangement 1 illustrates a control unit 3 comprising a voltage converter 5 and a disconnecting switch 4 that in this exemplary embodiment cooperates with a high voltage supply system and with a low voltage supply system for a motor vehicle. The voltage converter 5 comprises an input 7 for a direct voltage supply system, in particular an intermediate circuit voltage of the direct voltage supply system. The direct voltage supply system is also referred to hereinunder as the high voltage supply system.

The high voltage supply system is supplied by a high voltage battery 12. The high voltage battery 12 is embodied by way of example as a rechargeable battery, in particular as a lithium ion battery, as a sodium sulfur battery or as a lead battery. A voltage in the high voltage battery in the fully charged state amounts by way of example to between 200 and 500 volt. The high voltage battery 12 is connected to a positive pole by way of a connecting line 31 having a connection 6 of the disconnecting switch 4 for the battery.

The disconnecting switch 4 is designed so as to be controllable and is connected on the input side to a control output 35 of the voltage converter 5. A further connection of the disconnecting switch 4 is connected to a connecting junction 38 that is connected to the input 7. The connecting junction 38 is connected by way of a connecting line 30 to a power output stage 16 of an electric machine 20.

The electric machine 20 is by way of example a component of a drive for an electric vehicle, comprising the electric machine, the power output stage 16 and a processing unit 18. The power output stage 16 comprises by way of example a transistor half bridge for each stator coil of a stator of the electric machine 20. The power output stage 16 is also connected to a ground connection 22 of the high voltage supply system. The power output stage 16, in particular gate connections of the half bridges of the power output stage 16, are connected on the input side by way of a connection 32 to the processing unit 18.

The processing unit 18 is formed by way of example by means of a microcontroller or an FPGA (FPGA=field programmable gate array). The processing unit 18 is designed so as to control the power output stage 16 in order to supply current to the stator of the electric machine 20 and thus to generate a magnetic rotation field in order to cause a rotor of the electric machine 20 to rotate. The connecting line 30 is connected by way of a connecting junction 36 to an intermediate circuit capacitor 10.

The intermediate circuit capacitor is connected by means of a further connection to the ground connection 22. The intermediate circuit capacitor 10 is designed so as to store electrical energy having a voltage of the high voltage supply system. The voltage converter 5 is connected on the output side by way of an output 39 and in addition by way of a connecting line 33 to a low voltage supply system 14. The voltage converter 5 is also connected on the output side by way of a ground connection 23 to the low voltage supply system 14. The voltage converter 5 is designed by way of example to galvanically disconnect the high voltage supply system and the low voltage supply system from one another. For this purpose, the transformer 54 is designed by way of example as an isolating transformer. The ground connection 23 is thus then galvanically disconnected from the ground connection 22.

The voltage converter 5 comprises an input 8 for a discharge signal. The input 8 in this exemplary embodiment is connected to an engine hood switch 28, a fire sensor 26 and an accident sensor, in particular an acceleration sensor 24. The acceleration sensor 24 is designed so as to generate an acceleration signal that represents an accident and to provide said acceleration signal as a discharge signal at the input 8. The fire sensor 26 is designed so as to generate an output signal that represents a fire, in particular a fire on board a vehicle, and to provide said output signal as a discharge signal on the output side at the input 8.

The engine hood switch 28 is designed so as to generate an output signal that represents that an engine hood of the motor vehicle has been opened and to provide said output signal as a discharge signal at the input 8. The voltage converter 5 is designed so as to generate a disconnection signal in response to the discharge signal being received at the input 8 and to transmit said discharge signal at the output 35 to the disconnecting switch 4. The disconnecting switch 4 can then disconnect the high voltage battery 12 from the intermediate circuit in response to the disconnection signal. The power output stage 16 is then in this case only still connected to the voltage converter 5 by way of the input 7 and to the intermediate circuit capacitor 10.

In one embodiment, not illustrated, the voltage converter can also be operatively connected to the input 8 by means of a main switch or ignition lock in such a manner that, in the case of the main switch being switched off or rather in the case of the ignition being switched off, a discharge signal is generated and the intermediate circuit is discharged.

A hand 80 of a user is also illustrated, which hand can contact the connecting line 30 or an electrical connection that is connected to the connecting line 30. This can occur by way of example after an accident that is detected by means of the acceleration sensor 24, after a fire on board the motor vehicle in which the hand 80 comes into electrical operative contact with the connecting line 30 by way of the fire-fighting water, or after the engine hood has been opened which is detected by means of the engine hood switch 28, following which the hand 80 can come into contact with the intermediate circuit voltage as a result of contacting the connecting line 30.

The voltage converter 5 is further designed so as in response to the discharge signal that is received at the input 8 to discharge by way of the input 7 to the ground connection 22 the intermediate circuit capacitor 10 and further capacitances, such as also the capacitance that is itself formed by means of the connecting line 30, which capacitances are connected to the connecting line 30. For this purpose, using a pulse frequency that is designed so as to discharge the intermediate circuit capacitor 10, the voltage converter 5 can control an inverter, illustrated in further detail as an example hereinunder in FIG. 2, in such a manner that the discharge current is at a maximum by way of the inverter and by way of a transformer that is connected on the output side to the inverter, wherein in an advantageous manner a saturation current that represents a saturation of the magnetic flux in the transformer cannot be exceeded.

Figure 2:
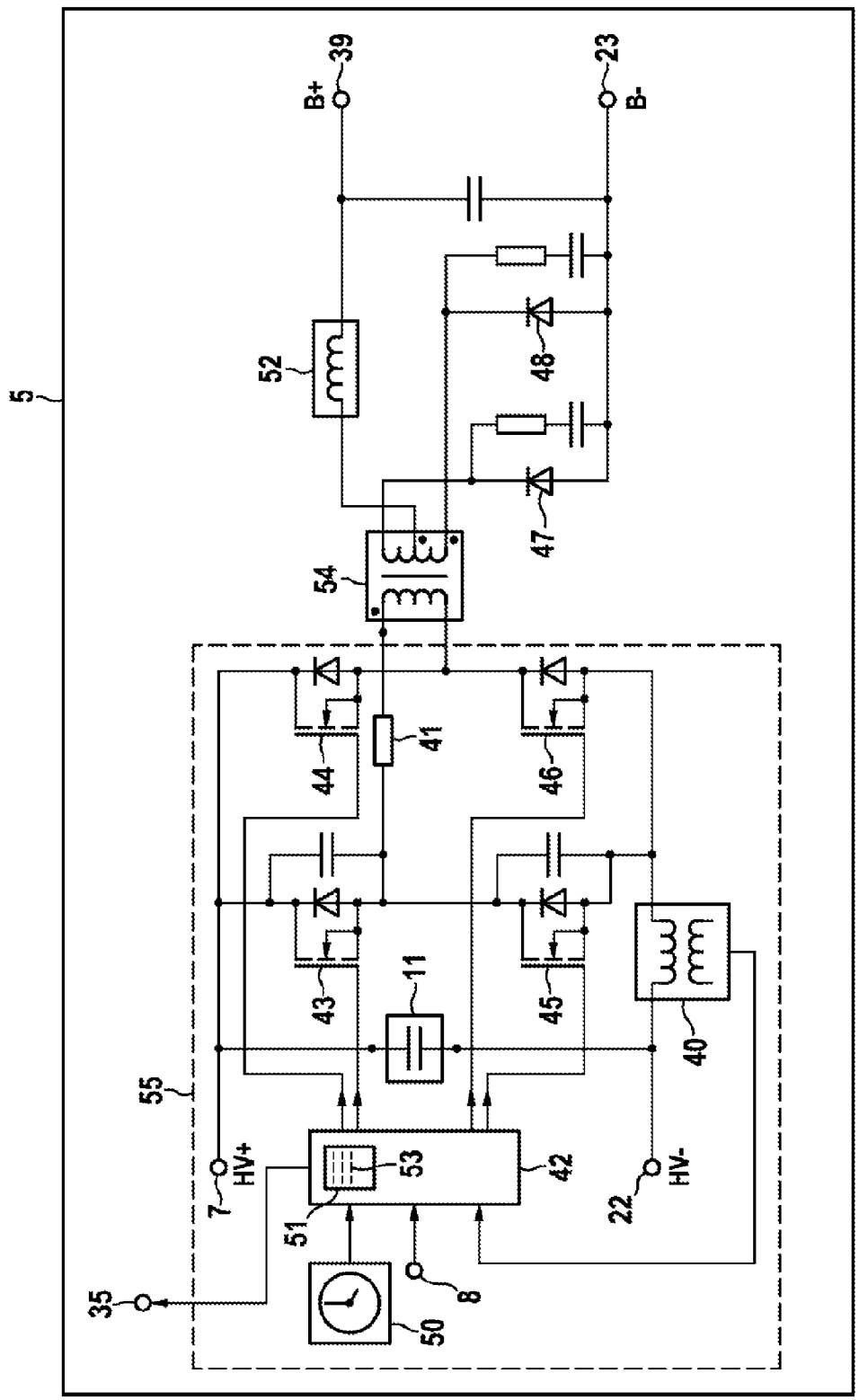
FIG. 2 illustrates in part schematically a switching arrangement for a voltage converter for an electric vehicle.

FIG. 2 illustrates a switching arrangement of the voltage converter 5 previously illustrated in FIG. 1. The voltage converter 5 comprises an inverter 55 having a processing unit 42 that is embodied by way of example as an FPGA, as a microcontroller or as a microprocessor. The processing unit 42 is connected on the output side to gate connections of switching transistors of the previously mentioned inverter. The switching transistors 43 and 45 form jointly a half bridge that is connected on the output side to a first connection of a primary winding of a transformer 54. The voltage converter also comprises two switching transistors 44 and 46 that form jointly a half bridge that is connected on the output side with a second connection of the primary winding of the transformer 54. The switching transistors 43 and 44 are designed in each case so as to use control signals of the processing unit 42 to switch in a controlled manner a positive high voltage potential that is prevailing at the input 7—which is switched by means of the disconnecting switch illustrated in FIG. 1—to the primary winding of the transformer 54.

The switching transistors 43 and 44 consequently form high side transistors; the transistors 45 and 46 form in each case low side transistors of the inverter 55 and are in each case designed so as in response to control signals that are generated by the processing unit 42 and are received on the input side to connect the second connection of the primary winding of the transformer 54 to the ground connection 22 of the high voltage supply system.

The transistors 43, 44, 45 and 46 are embodied by way of example in each case as a field effect transistor or an IGBT (IGBT=insulated gate bipolar transistor).

The inverter 55 also comprises a backup capacitor 11 that is connected to the input 7 and to the ground connection 22. The processing unit 42 is connected on the input side to the input 8, previously described in relation to FIG. 1, for the discharge signal. The processing unit 42 is also connected on the input side to a clock-signal generator 50 that is designed so as to generate a switching signal—as a time basis for controlling the switching transistors 43, 44, 45 and 46—and to provide said switching signal on the input side to the processing unit 42. The processing unit 42 is designed so as in response to the switching signal that is received from the clock-signal generator 50 to control the switching transistors 43, 44, 45 and 46 in order to generate an alternating voltage. The frequency of the alternating voltage amounts by way of example to 100 kilohertz. The processing unit 42 is designed so as in response to the discharge signal that is received at the input 8 to divide the frequency that is received from the clock-signal generator 50, in particular to divide said frequency downwards, so that the divided frequency is less than the switching signal frequency that is generated by the clock-signal generator 50. The processing unit 42 is further designed so as in response to the discharge signal to use the divided frequency to control the inverter, in particular the switching transistors 43, 44, 45 and 46, in order to generate an alternating voltage.

The inverter 55 in this exemplary embodiment comprises a current sensor 40 that is embodied in this exemplary embodiment as an impedance-matching transformer. The current sensor 40 connects source connections of the switching transistors 45 and 46 to the ground connection 22. The figure also illustrates a current sensor 41 that is embodied as a shunt resistor. The current sensor 41 can in addition to or independently from the current sensor 40 be a component of the inverter 55. The current sensor 41 connects the output of the half bridge that is formed by the switching transistors 43 and 45 to the first connection of the primary coil of the transformer 54. The processing unit 42 is designed so as in response to the current signal that is received by the current sensor 40 and in response to the discharge signal that is received at the input 8 to generate the divided frequency in order to control the switching transistors 43, 44, 45 and 46 in such a manner that a predetermined threshold value of the current that is detected by means of the current sensor 40 is not exceeded. The threshold value of the current corresponds by way of example to a saturation of the magnetic flux in the transformer 54. The transformer 54 is connected on the output side to a rectifier by way of a secondary winding. The rectifier in this exemplary embodiment is formed by means of two diodes 47 and 48. The rectifier in a different exemplary embodiment can be embodied as a rectifier bridge. It is also possible in place of the illustrated rectifier to connect to the transformer a current doubler that comprises an active or passive power rectification. The voltage converter also comprises on the secondary side an inductance 52 that is connected to a pick-up point, in particular a middle pick-up point of the secondary winding of the transformer 54. The inductance 52 connects the middle pick-up point to an output 39 that—as illustrated in FIG. 1—is connected to the low voltage supply system 14. The secondary winding of the transformer 54 comprises in addition to the previously mentioned middle pick-up point two connections, wherein a first connection is connected by way of the diode 47 to a ground connection 23 for the low voltage supply system and the second connection is connected to said ground connection by way of the diode 48.

The processing unit 42 in a different embodiment can be designed so as to limit the current flowing through the primary winding of the transformer 54 by means of pulse width modulation of the half waves that are generated by means of the transistor half bridges.

Figure 3:
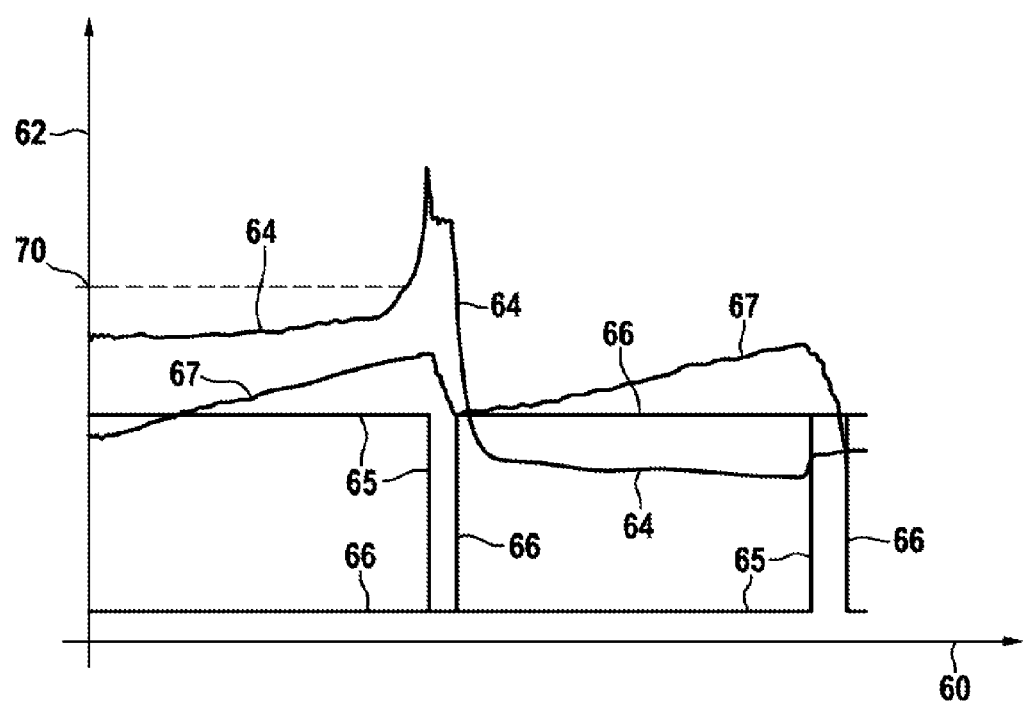
FIG. 3 illustrates a diagram with signal graphs of signals that are plotted with respect to time and which signals have been ascertained during the operation of the voltage converter illustrated in FIG. 2.

FIG. 3 illustrates a diagram with a time axis 60 and an amplitude axis 62. The figure illustrates clock signals that are generated by the inverter 5 illustrated in FIGS. 1 and 2. The figure illustrates a curve 64 that represents the current that is detected by the current sensor 40 in FIG. 2. The figure also illustrates by way of the broken line a threshold value 70 of the current 64 that is represented by way of example in the processing unit 42, illustrated in FIG. 2, as a predetermined current value—represented by a data record 53—in a storage device 51 of the processing unit 42.

The figure also illustrates a curve 67 that represents a current flowing through the inductance 52 in FIG. 2.

A curve 65 represents an output voltage of the transistor half bridge comprising the switching transistors 43 and 45; a curve 66 represents an output voltage of the half bridge that is formed by the transistors 44 and 46.

The invention claimed is:

1. A control unit (3) for a motor vehicle, the control unit (3) comprising:
   a voltage converter (5) having an input (7) for a direct voltage supply system (10, 12, 16) and is configured to generate a direct voltage output that is less than an input voltage at the input (7) for the direct voltage supply system and to output the direct voltage on an output side, the voltage converter (5) including
   an inverter (55),
   a transformer (54) that is connected to the inverter (55), and
   an input (8) for a discharge signal and is configured to respond to the discharge signal by discharging, by way of the inverter (55), an intermediate circuit capacitor (10) that is connected to the input (7) for the direct voltage supply system and reducing a working frequency of the inverter (55).

2. The control unit (3) as claimed in claim 1, wherein the control unit (3) is configured to halve the working frequency of the inverter (55).

3. The control unit (3) as claimed in claim 1, wherein the voltage converter (5) is configured to respond to a magnetic flux in the transformer (54) to limit a current (64) that is switched from the inverter (55) to the transformer (54).

4. The control unit (3) as claimed in claim 1, wherein the control unit (3) comprises a controllable disconnecting switch (4) that comprises a connection (6) for an electric battery (12) and a connection for an intermediate circuit capacitor (10) and the control unit (3) is configured to respond to the discharge signal to generate a disconnection signal and to transmit said disconnection signal to the disconnecting switch (4) in order to disconnect the battery (12) from the at least one intermediate circuit capacitor (10).

5. A switching arrangement (1) for a vehicle having an electric drive (16, 18, 20) having a control unit (3) as claimed in claim 1,
and an intermediate circuit capacitor (10), wherein the intermediate circuit capacitor (10) is connected to the input (7) for the direct voltage supply network and the input (7) for the direct voltage supply network is connected by way of the disconnecting switch (4) to the connection (6) for the battery (12).

6. The switching arrangement (1) as claimed in claim 5, wherein the switching arrangement (1) comprises an engine hood switch (28) that is connected to the input (8) for the discharge signal, which engine hood switch is configured to generate the discharge signal in response to an engine hood of the vehicle being opened.

7. The switching arrangement (1) as claimed in claim 5, wherein the switching arrangement (1) comprises an accident sensor (24) that is connected to the input (8) for the discharge signal, which accident sensor is configured to respond to an acceleration acting upon the accident sensor (24) to detect the discharge signal and in response to the acceleration to generate the discharge signal.

8. A motor vehicle having an electric drive (16, 18, 10) having a control unit as claimed in claim 1.

9. The control unit (3) as claimed in claim 1, wherein the voltage converter (5) is configured to respond to a saturation of a magnetic flux in the transformer (54) to limit a current (64) that is switched from the inverter (55) to the transformer (54).

10. A motor vehicle having an electric drive (16, 18, 10) having a switching arrangement as claimed in claim 5.

11. A method for discharging an intermediate circuit capacitor (10) of a switching arrangement (1) for an electric vehicle or a hybrid vehicle comprising a voltage converter (5) having an input (7) for a direct voltage supply system (10, 12, 16) and configured to generate a direct voltage output that is less than an input voltage at the input (7) for the direct voltage supply system and to output the direct voltage on an output side, the voltage converter (5) including an inverter (55), a transformer (54) that is connected to the inverter (55), and an input (8) for a discharge signal that is connected to the intermediate circuit capacitor (10) at the input (7), wherein a discharge signal is generated and in response to the discharge signal a working frequency of an inverter (55) of the voltage converter (5) is reduced in comparison to when a discharge signal is not provided so that the intermediate circuit capacitor (10) is discharged by way of the inverter (55) more rapidly than when a discharge signal is not provided.

12. The method as claimed in claim 11, wherein a current (64) is limited by the inverter (55) in response to a magnetic flux in a transformer (54) that is connected to an output of the inverter (55).

13. The method as claimed in claim 11, wherein the discharge signal is generated in response to an engine hood of an electric vehicle being opened, in response to an acceleration signal that represents an accident and in response to an alarm signal that represents a fire on board a vehicle.

* * * * *